United States Patent [19]

Wiegers et al.

[11] Patent Number: 4,600,435
[45] Date of Patent: Jul. 15, 1986

[54] SOLVENT EXTRACTION OF COBALT (II) FROM SULFATE SOLUTIONS WITH COBALT EXTRACTANTS

[75] Inventors: Ben W. Wiegers, Wilmer, Ala.; Eddie C. J. Chou, Arvada, Colo.; John D. Bruno, Golden, Colo.; Helen S. Leaver, Pine, Colo.

[73] Assignee: AMAX Inc., Greenwich, Conn.

[21] Appl. No.: 643,998

[22] Filed: Aug. 24, 1984

[51] Int. Cl.$^4$ ............................................. C22B 23/04
[52] U.S. Cl. ........................................ 75/119; 75/108; 75/101 BE; 75/121; 423/139; 423/140; 423/150; 423/157
[58] Field of Search ................ 75/119, 108, 101 R, 75/101 BE, 121; 423/150, 140, 139, 157; 201/7

[56] References Cited

U.S. PATENT DOCUMENTS 3,399,055 8/1968 Ritcey et al. ................... 423/139
4,210,625 7/1980 Flett ............................... 423/139

FOREIGN PATENT DOCUMENTS 1466085 3/1977 United Kingdom .

Primary Examiner—John Doll
Assistant Examiner—Robert L. Stoll
Attorney, Agent, or Firm—Michael A. Ciomek; Eugene J. Kalil

[57] ABSTRACT

Nickel and cobalt contained in aqueous sulfate solution are separately recovered by counter-current solvent extraction using a cobalt-selective organic extractant while scaling of equipment and cobalt recycle are minimized by controlling aqueous pH at the extraction, scrubbing and stripping stages to maximize cobalt loading and selectivity of the extractant while loading scale-causing ions such as calcium and magnesium in the extractant and removing them from the circuit with the aqueous cobalt strip solution.

9 Claims, 1 Drawing Figure

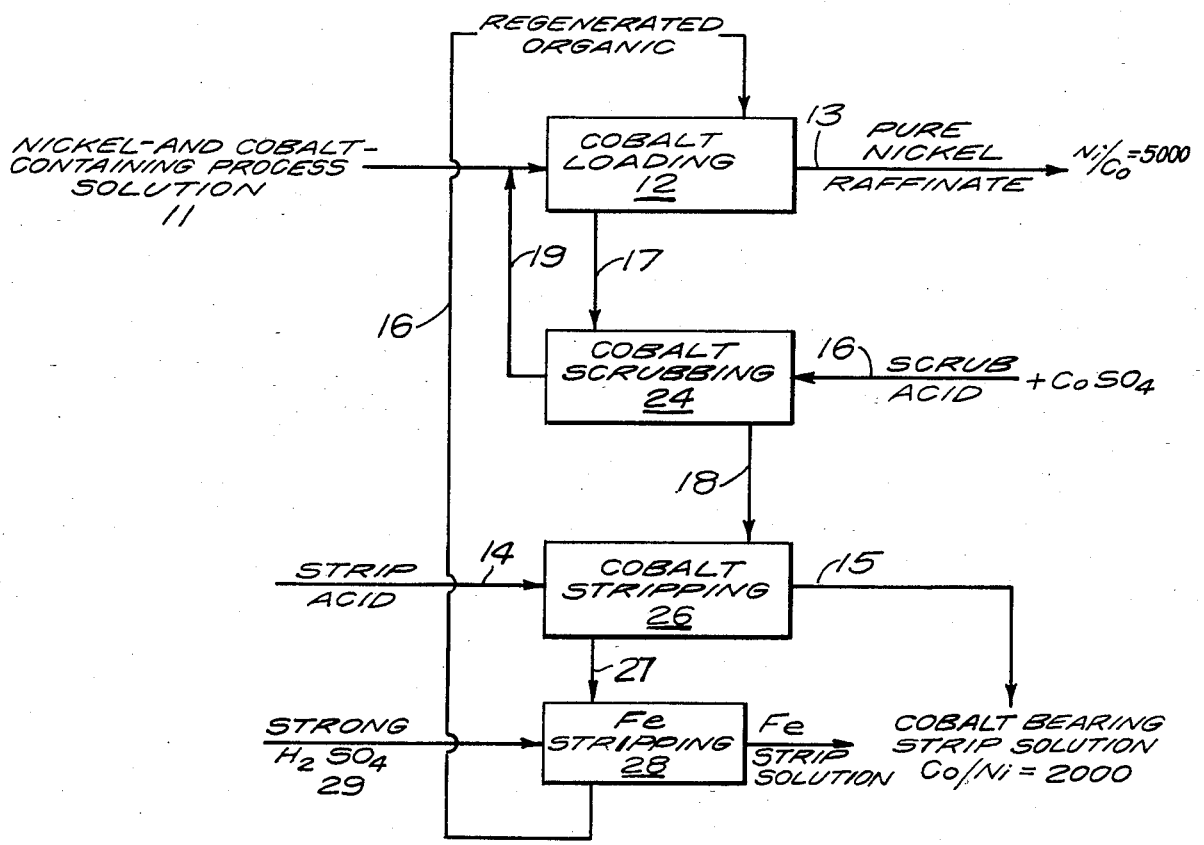

SOLVENT EXTRACTION OF COBALT (II) FROM SULFATE SOLUTIONS WITH COBALT EXTRACTANTS

The invention is directed to a process for separately recovering nickel and cobalt contained in a nickel sulfate solution using solvent extraction wherein scaling of equipment due to alkaline earth metal ions contained in the solution is minimized and cobalt recycle is also minimized.

BACKGROUND OF THE INVENTION AND THE PRIOR ART

Solvent extraction using a water-immiscible extractant to remove one ion selectively from others in aqueous solution is a known commercial process. Solvent extraction to remove cobalt from nickel in solution using esters, salts and other organic derivatives of phosphoric, phosphinic and phosphonic acids as selective extractants is known. Generally, alkyl esters of alkyl phosphonic acid and phosphinic acid, which are described for example in U.S. Pat. Nos. 4,196,076, 4,242,314, 4,246,240, 4,348,367, 4,353,883 and 4,382,016 are regarded as being the most selective cobalt extractants. Even with a highly selective extractant, however, more or less nickel will coextract with the cobalt and the extraction circuit will provide for operations to remove such nickel, to regenerate the extractant and to recycle recoverable metal ions.

The extractants themselves are usually dissolved in varying proportions in water-immiscible solvents such as kerosene. The operations involved include extraction in which the raw feed solution containing nickel and cobalt is contacted countercurrently in one or more stages with the extractant to yield a cobalt-loaded extractant and a purified nickel sulfate raffinate which is removed from the circuit. Usually a scrubbing operation is performed on the loaded extractant to remove coextracted nickel and possibly other ions from the cobalt-loaded organic extractant. The scrubbed organic is then stripped with acid solution to yield an aqueous cobalt solution which is removed from the circuit, and to recover the extractant for re-use to extract more cobalt. Aqueous scrub solutions containing cobalt and nickel ions are returned to the extraction step.

The circuit is designed to be operated continuously over long time periods to provide nickel sulfate and cobalt sulfate solutions of sufficient purity that they may be treated for metal recovery by means such as hydrogen reduction to provide metal of commercial purity. In such lengthy operation it is found that alkaline earth metal ions, e.g., calcium and magnesium, present in the raw nickel sulfate solution (which may be, for example, obtained by sulfuric acid leaching of a lateritic nickel ore or oxidation leaching of nickel matte) causes buildup of a hard, adherent and coherent scale on the interior faces of equipment. The scale can build up to the extent of blocking lines, interfering with pumps, interfering with heat transfer, and being in other ways harmful and undesirable. Scale buildup can cause shutdown of plant in order to effect removal. Scale buildup is accordingly an expensive and vexing problem. It is also desirable for economic reasons to minimize recycle of cobalt. It is to the solution of these problems and associated problems that the present invention is directed.

It is known that the extraction process itself operates to transfer selectively across an organic-aqueous interface ions present in the aqueous phase. The organic and aqueous phases are accordingly intermixed to provide a large interfacial area across which the selected ions may pass. After contact of the phases, they are settled in quiescent fashion to achieve separation of the organic and aqueous phases. Equipment designed to accomplish the foregoing is used as is known in the art.

BRIEF DESCRIPTION OF THE INVENTION

Nickel sulfate solutions containing cobalt in a nickel:cobalt ratio between about 3:1 or about 10:1 to about 65:1 and containing an alkaline earth metal ion is subjected to solvent extraction using a cobalt-selective extractant under controlled pH conditions such that the nickel sulfate solution has a pH less than 5 and the purified nickel sulfate raffinate has a pH greater than 5; the resulting cobalt loaded extractant containing coextracted nickel and at least some of the alkaline earth metal ion is scrubbed with an acidic aqueous scrub solution containing up to 30 gpl cobalt and having a pH of about 3 to about 6 and the aqueous scrub raffinate has a pH above the pH of the scrub solution, after which the scrubbed organic is stripped with an acid solution, yielding a purified aqueous cobalt sulfate solution containing the extracted alkaline earth metal ion and a re-usable organic extractant, while minimizing cobalt recycle and scaling of the apparatus used.

BRIEF DESCRIPTION OF THE DRAWING

The drawing illustrates a schematic of the process of the invention.

DETAILED DESCRIPTION OF THE INVENTION

The invention will now be described in connection with the drawing in which reference character 11 depicts an acid aqueous nickel sulfate process stream containing cobalt with a nickel/cobalt ratio between about 65 and about 3. Process streams containing about 5 to about 120 grams per liter (gpl) nickel, about 0.3 to about 40 gpl cobalt, up to about 1 gpl copper, up to about 1 gpl zinc, up to about 1 gpl chromium, up to about 0.4 gpl calcium, up to about 4 gpl magnesium, up to about 1 gpl iron, etc., may be treated in accordance with the invention. The streams may have a pH ranging from about 2 to about 6.5, preferably from about pH 4 to about pH 6. Stream 11 is treated at step 12 with a cobalt-selective extractant which may be an organic derivative of a phosphorous acid from the group consisting of phosphoric acid, phosphinic acid and phosphonic acid. Of these the organic phosphates are the least selective for cobalt and the phosphinates are the most selective for cobalt. These extractants also have some capability for loading calcium and/or magnesium. Those skilled in the art will appreciate that it is an advantage to employ a selective extractant since with less selective extractants, more extraction stages need to be provided. An organic/aqueous volume ratio (O/A) of about 0.1 to about 10, preferably about 0.5 to about 5 is employed in extraction step 12. Step 12 may be performed in one or more mixer-settlers, or other apparatus known to the art for intermingling immiscible liquids in intimate contact one with the other. The products of step 12 are purified nickel raffinate 13 and loaded organic 17 which contains coextracted nickel and some of the impurity ions initially present in process solution 11. The nickel sulfate raffinate will typically have metal ratios including Ni/Co=5000; Ni/Cu>9000; Ni/Zn>9000. The loaded organic is scrubbed at 24 using an acidic cobalt sulfate strip solution 16 which contains about 20 to about 80 gpl cobalt sulfate acidified with sulfuric acid to a pH of about 3 to about 6. Cobalt in the scrub solution exchanges with nickel in the loaded organic and the acidic nickel-bearing solution 19 resulting from scrubbing is returned to cobalt loading step 12 as indicated. Scrubbed organic 18 is then transferred to cobalt stripping operation 26 and is stripped with sulfuric acid solution 14 to yield cobalt bearing aqueous strip solution 15 having a high ratio of cobalt to nickel and stripped organic 27. The acid strength during scrubbing and cobalt stripping operations is controlled to cause retention of almost all the extracted iron in the organic phase. Almost complete separation of iron and cobalt is thus obtained. Retained iron is stripped from the organic 27 in iron stripping operation 28 using strong (8 molar) sulfuric acid solution 29 and the stripped organic 16 is recycled to cobalt loading operation 12. The cobalt-bearing solution, now containing 30 to 90 gpl cobalt and having only a small fraction of the volume of the original nickel process solution may now be further purified if desired. Typical metal ratios in the cobalt sulfate strip product at this point include Co/Ni=2000; Co/Cu>40 and Co/Zn 42 to 15000.

For purposes of the invention, the pH of aqueous solution 11 entering step 12 must be below 5 and the pH of nickel raffinate 13 must be above 5. It is to be appreciated that two common problems are associated with the use of cobalt-selective extractants based upon a phosphorous acid; namely, multi-stage countercurrent contactors are required for a complete separation of cobalt from nickel and calcium and magnesium scale buildup in the solvent extraction circuit. The present invention provides a low-high pH control process for improving the nickel-cobalt separation efficiency and minimizing cobalt recycle and calcium and magnesium scaling.

For these cobalt-selective extractants, both cobalt and nickel extraction increase with equilibrium pH's from about 4 to 7, and the maximum cobalt-loading selectivity occurs at the low pH level of the pH range described. Therefore, pH control in a countercurrent extraction section must fulfill several functions: the pH must be high enough (pH>5) in the nickel raffinate to effectively reduce cobalt concentration. While in the stage where aqueous feed enters extraction, the pH must be low enough (pH<5) to maintain high cobalt-loading selectivity and a high cobalt-to-nickel ratio in the loaded organic. The low-high pH control can be achieved by adjusting aqueous pH with acid or base, and/or using a cobalt extractant in an acid or a salt form. The pH difference between nickel sulfate raffinate and the original nickel sulfate solution is preferably at least 1 pH unit.

When extracting cobalt from a high-nickel, low-cobalt sulfate solution, the loaded organic usually has a cobalt-to-nickel ratio less than 50. For practical purposes, the ratio should be greater than 1000. The way to improve the ratio is to scrub the loaded nickel in the loaded organic with a cobalt solution within the pH range of 3 to 6. Within the pH range, the cobalt-to-nickel ratio in the organic can be improved by maintaining a low pH level at the stage where the aqueous scrub feed enters the scrubbing and by maintaining a high pH level at the stage where the scrub raffinate leaves the scrubbing. In other words, for maximizing cobalt-nickel separation in scrubbing, the pH difference between scrub feed and scrub raffinate should be maximized, preferably by at least about 1 pH unit. This criterion can be achieved by internal pH adjustments or by loading a certain amount of base (sodium or ammonium ions) with cobalt during the extraction stage. Once the loaded organic is scrubbed with a low pH scrub feed, the pH of the scrub raffinate 19 increases proportionally to the amount of the base transferred during the scrubbing. In addition, the low-high pH control can minimize the amount of cobalt recycle from scrubbing to extraction stage, and can prevent the buildup of calcium and magnesium between these two stages.

The low-high pH in the extraction and the scrubbing stages can also be controlled by varying the organic-to-aqueous (O/A) ratios. For example, if the organic is in an acid form, a decrease of the O/A ratio in the extraction stage will result in a high pH raffinate.

Examples will now be given in which cobalt extractants SME 418 (a phosphonic compound produced by Shell Chemicals) and C-272 (a phosphinic compound produced by Cyanamid) were used to remove cobalt from nickel sulfate solutions.

EXAMPLE 1

This example is to illustrate that during the countercurrent extraction, the high-low pH control at the points of organic inlet (aqueous outlet) and outlet (aqueous inlet), respectively, can enhance the loading capacity and the loading selectivity of cobalt from a nickel sulfate solution containing 100 gpl Ni and 2.6 gpl Co. During these tests, 20 v/o SME 418 was in contact with the aqueous solution at O/A=0.5 and 50° C. Ammonium hydroxide was used for pH control.

TABLE 1

| Test No. | Organic Inlet (Aqueous Outlet) | | | Organic Outlet (Aqueous Inlet) | | | | Co/Ni |
|---|---|---|---|---|---|---|---|---|
| | pH | $(Co)o$ | $(Co)A$ | pH | $(Co)o$ | $(Co)A$ | $(Ni)o$ | |
| A | 5.3 | 30 ppm | 2 ppm | 4.7 | 5.86 gpl | .864 gpl | .81 gpl | 7.2 |
| B | 5.1 | 60 ppm | 2 ppm | 5.0 | 4.9 gpl | .138 gpl | 5.2 gpl | 0.9 |

Results show that at the organic inlet (i.e., nickel raffinate outlet) only 2 ppm cobalt remains in the nickel raffinate in both tests. Since the high-low pH control is more pronounced in Test A than in Test B, the cobalt loading capacity and selectivity in Test A are much better than in Test B.

EXAMPLE 2

This example is to illustrate that during the countercurrent extraction, the high-low pH control at the points of organic inlet and outlet, respectively, can be enhanced by varying organic-to-aqueous ratio. During these tests, 15 v/o SME 418 was in contact with the same aqueous solution shown in Example 1 at 50° C. The aqueous flow and the rate of ammonium hydroxide addition were the same for both tests.

TABLE 2

| Test No. | O/A | pH Org. Outlet | pH Org. Inlet | Loaded Organic Co gpl | Loaded Organic Ni gpl | Loaded Organic Co/Ni |
|---|---|---|---|---|---|---|
| C | 0.9 | 4.3 | 4.8 | 3.1 | 1.4 | 2.2 |
| D | 0.5 | 4.2 | 5.0 | 5.0 | 0.9 | 5.6 |

Results indicate that the high-low pH control is more pronounced in Test D than in Test C, and the loading capacity and selectivity of cobalt in Test D are also improved.

EXAMPLE 3

This example is to illustrate that during the countercurrent scrubbing, the cobalt-to-nickel ratio in the loaded organic can be improved, and the amount of cobalt recycle can be reduced by maintaining a low pH level at the stage where scrub feed enters and by maintaining a high pH level at the stage where the scrub raffinate leaves the scrubbing. During these tests, the loaded 14 v/o C-272 containing about 3.4 gpl Co and 0.9 gpl Ni was scrubbed with a cobalt solution containing about 17 gpl Co at O/A about 4.6 and 50° C.

TABLE 3

| Test No. | Scrub Feed pH | Scrub Raffinate pH | Scrubbed Org. Co gpl | Scrubbed Org. Ni ppm | Co/Ni | % Co Recycle |
|---|---|---|---|---|---|---|
| E | 4.2 | 4.2 | 4.3 | 40 | 108 | 94 |
| F | 4.1 | 5.5 | 4.67 | 7 | 667 | 17 |

Results show that the low-high pH control at scrubbing stage can improve cobalt-to-nickel ratio in the loaded organic and can reduce the amount of cobalt to be recycled to the extraction stage.

EXAMPLE 4

This example is to illustrate that during the countercurrent scrubbing, the low-high pH control as described in Example 3 can prevent scale formation because of the buildup of magnesium and calcium between the extraction and the scrubbing stages. During these tests, the cobalt loaded 14 v/o C-272 containing about 20 ppm Ca and 14 ppm Mg was scrubbed with a cobalt solution containing about 17 gpl Co at O/A about 4.6 and 50° C.

TABLE 4

| Test No. | Scrub Feed pH | Scrub Raffinate pH | Metal Scrubbed, % Ca | Metal Scrubbed, % Mg |
|---|---|---|---|---|
| E | 4.2 | 4.2 | 68 | 93 |
| G | 4.2 | 6.0 | 0 | 0 |

Results show that the low-high pH control at scrubbing stage can prevent the scale formation resulting from the buildup of calcium and magnesium.

It is to be appreciated that calcium and magnesium ions not extracted by the cobalt extractant at step 12 will remain with the nickel sulfate raffinate 13. The raffinate 13 will be of sufficient purity to be treated for nickel recovery by processes such as hydrogen reduction. Calcium and magnesium in solution are not reduced and will report as harmless impurities in the by-product ammonium sulfate generated during hydrogen reduction.

On the other hand, calcium and magnesium extracted with the cobalt will report with the cobalt sulfate solution when cobalt is stripped from the organic at step 26. Conditions in scrubbing 24 should not be so acid as to cause removal of calcium and magnesium ions from the organic. Nickel raffinate 13 and cobalt strip solution 15 will thus contain essentially the whole of the calcium and magnesium contents of original process solution 11 and the scale-producing ions will thus be effectively removed from the extraction circuit before any substantial circulation of scale-producing ions through the circuit takes place.

Scale buildup and wasteful recirculation of cobalt are thus minimized.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. In the process for separating nickel and cobalt contained in an aqueous nickel sulfate solution by countercurrent solvent extraction using an organic cobalt-selective extractant of low water solubility wherein apparatus employed for conducting said process becomes coated on the contacting surfaces thereof with scale deposits due to alkaline earth metal ions present in the solutions being treated, the improvement for inhibiting said scale formation which comprises contacting said nickel sulfate solution containing no more than 4 gpl magnesium and no more than 0.4 gpl calcium at a pH below 5 with said extractant to produce a purified nickel sulfate raffinate having a pH above 5 and a loaded extractant containing cobalt, scrubbing said loaded extractant with an acidic cobalt sulfate solution having a pH below 5 to produce a scrub raffinate having a pH higher than 5 and to scrub coextracted nickel from said loaded organic, and stripping cobalt and said alkaline earth metal ion from said loaded organic with an acid solution to recover said organic for reuse, to provide a cobalt strip solution low in nickel and thereby minimize cobalt recycle, with said magnesium and calcium contained in said nickel sulfate solution being removed from said extraction circuit as constituents of said nickel raffinate and said cobalt strip solution, thereby minimizing scale formation on said contact surfaces.

2. The process in accordance with claim 1 wherein said extractant is selected from the group consisting of phosphoric acid, phosphonic acid, phosphinic acid, salts and derivatives thereof and the pH of said nickel sulfate raffinate is at least 1 pH unit higher than the pH of said nickel sulfate solution.

3. The process in accordance with claim 2 wherein said extractant is employed as a solution in a water-immiscible organic solvent.

4. The process in accordance with claim 1 wherein said cobalt sulfate scrub solution contains up to about 30 gpl cobalt and pH control of the scrub raffinate is enhanced by varying the organic to aqueous ratio in the scrub.

5. The process in accordance with claim 1 wherein the pH of said scrub raffinate is at least about 1 pH higher than the pH of said acidic sulfate scrub solution.

6. The process in accordance with claim 1 wherein pH control in said extractant-loading and said loaded extractant scrubbing steps is accomplished by loading said extractant with a base during the extracting stage.

7. The process in accordance with claim 1 wherein the pH difference between said scrubbing solution and said scrub raffinate is maximized by internal pH adjustment using a base from the group consisting of ammonia, sodium hydroxide and potassium hydroxide.

8. In the process for separating by countercurrent solvent extraction, using a cobalt-selective organic extractant, nickel and cobalt contained in an aqueous nickel sulfate solution which also contains an alkaline earth metal ion wherein scaling of apparatus used for extractant loading, for loaded extractant scrubbing and for circulating liquids therebetween can occur, the improvement for minimizing said scaling which comprises controlling pH of the nickel sulfate raffinate from extraction to be higher than that of the initial nickel sulfate solution and controlling the pH of the scrub raffinate to be higher than that of the scrubbing solution so that alkaline earth metal not loaded by said extractant leaves the circuit with the nickel sulfate raffinate and alkaline earth metal loaded on said extractant leaves the circuit with the purified cobalt solution resulting when the scrubbed loaded organic is stripped of cobalt using an aqueous acidic solution, thereby minimizing scale formation.

9. The process in accordance with claim 8 wherein said alkaline earth metal ion is from the group consisting of magnesium and calcium.

* * * * *